US010162552B2

United States Patent
Danilov et al.

(10) Patent No.: US 10,162,552 B2
(45) Date of Patent: Dec. 25, 2018

(54) SYSTEM AND METHOD FOR QUASI-COMPACTING GARBAGE COLLECTION

(71) Applicant: EMC IP Holding Company LLC, Hopkinton, MA (US)

(72) Inventors: Mikhail Danilov, Saint Petersburg (RU); Mikhail Malygin, Saint Petersburg (RU); Ivan Tchoub, Saint Petersburg (RU); Andrey Fomin, Vesevolozhsk (RU); Maxim Trusov, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 17 days.

(21) Appl. No.: 15/367,666

(22) Filed: Dec. 2, 2016

(65) Prior Publication Data

US 2017/0285952 A1    Oct. 5, 2017

(30) Foreign Application Priority Data

Mar. 31, 2016    (RU) .............................. 2016112182

(51) Int. Cl.
*G06F 3/06*     (2006.01)
*G06F 12/02*    (2006.01)

(52) U.S. Cl.
CPC .............. *G06F 3/064* (2013.01); *G06F 3/067* (2013.01); *G06F 3/0608* (2013.01); *G06F 3/0652* (2013.01); *G06F 12/0246* (2013.01); *G06F 12/0253* (2013.01)

(58) Field of Classification Search
CPC ...... G06F 3/0608; G06F 3/064; G06F 3/0652; G06F 3/067; G06F 12/0246; G06F 12/0253
See application file for complete search history.

(56) References Cited

U.S. PATENT DOCUMENTS

| | | | |
|---|---|---|---|
| 5,561,786 A * | 10/1996 | Morse .................... | G06F 12/023 711/170 |
| 5,634,050 A * | 5/1997 | Krueger .............. | G06F 11/1435 |
| 7,739,406 B2 * | 6/2010 | Boylan ............. | H04L 29/12283 709/224 |
| 7,769,967 B2 * | 8/2010 | Zhu ........................ | G06F 3/0608 711/100 |
| 2005/0027761 A1 * | 2/2005 | Wu ...................... | G06F 12/0261 |

* cited by examiner

*Primary Examiner* — Aracelis Ruiz (74) *Attorney, Agent, or Firm* — Brian J. Colandreo; Mark H. Whittenberger; Holland & Knight LLP (57) ABSTRACT

A method, computer program product, and computer system for identifying, by a computing device, a plurality of used chunks, wherein the plurality of used chunks may include a plurality of free blocks and at least one non-free block. A capacity of the plurality of free blocks that is available to reclaim may be verified. The capacity of the plurality of free blocks may be reclaimed. A composite chunk from the plurality of free blocks may be created.

18 Claims, 8 Drawing Sheets

FIG. 8

SYSTEM AND METHOD FOR QUASI-COMPACTING GARBAGE COLLECTION

RELATED APPLICATION

The subject application claims the priority of Russia Patent Application No. 2016112182, filed on 31 Mar. 2016, the contents of which are herein incorporated by reference in its entirety.

BACKGROUND

Generally, with the increasing amounts of information being stored, it may be beneficial to efficiently store and manage that information. While there may be numerous techniques for storing and managing information, each technique may have tradeoffs between reliability and efficiency.

BRIEF SUMMARY OF DISCLOSURE

In one example implementation, a method, performed by one or more computing devices, may include but is not limited to identifying a plurality of used chunks, wherein the plurality of used chunks may include a plurality of free blocks and at least one non-free block. A capacity of the plurality of free blocks that is available to reclaim may be verified. The capacity of the plurality of free blocks may be reclaimed. A composite chunk from the plurality of free blocks may be created.

One or more of the following example features may be included. The plurality of used chunks may include at least one repository chunk, wherein the at least one repository chunk may include user data. The capacity of the plurality of free blocks may be reclaimed while at least one of the plurality of used chunks is in use by the at least one non-free block. Verifying that the capacity of the plurality of free blocks is available to reclaim may include ignoring at least a portion of the plurality of free blocks that is below a threshold size. Verifying that the capacity of the plurality of free blocks is available to reclaim may include shortening a free block of the plurality of free blocks that is above a threshold size. The composite chunk may include a first portion of the plurality of free blocks from a first chunk of the plurality of used chunks, and a second portion of the plurality of free blocks from a second chunk of the plurality of used chunks. The composite chunk may be created without moving the plurality of free blocks and the at least one non-free block.

In another example implementation, a computing system includes a processor and a memory configured to perform operations that may include but are not limited to identifying a plurality of used chunks, wherein the plurality of used chunks may include a plurality of free blocks and at least one non-free block. A capacity of the plurality of free blocks that is available to reclaim may be verified. The capacity of the plurality of free blocks may be reclaimed. A composite chunk from the plurality of free blocks may be created.

One or more of the following example features may be included. The plurality of used chunks may include at least one repository chunk, wherein the at least one repository chunk may include user data. The capacity of the plurality of free blocks may be reclaimed while at least one of the plurality of used chunks is in use by the at least one non-free block. Verifying that the capacity of the plurality of free blocks is available to reclaim may include ignoring at least a portion of the plurality of free blocks that is below a threshold size. Verifying that the capacity of the plurality of free blocks is available to reclaim may include shortening a free block of the plurality of free blocks that is above a threshold size. The composite chunk may include a first portion of the plurality of free blocks from a first chunk of the plurality of used chunks, and a second portion of the plurality of free blocks from a second chunk of the plurality of used chunks. The composite chunk may be created without moving the plurality of free blocks and the at least one non-free block.

In another example implementation, a computer program product resides on a computer readable storage medium that has a plurality of instructions stored on it. When executed by a processor, the instructions cause the processor to perform operations that may include but are not limited to identifying a plurality of used chunks, wherein the plurality of used chunks may include a plurality of free blocks and at least one non-free block. A capacity of the plurality of free blocks that is available to reclaim may be verified. The capacity of the plurality of free blocks may be reclaimed. A composite chunk from the plurality of free blocks may be created.

One or more of the following example features may be included. The plurality of used chunks may include at least one repository chunk, wherein the at least one repository chunk may include user data. The capacity of the plurality of free blocks may be reclaimed while at least one of the plurality of used chunks is in use by the at least one non-free block. Verifying that the capacity of the plurality of free blocks is available to reclaim may include ignoring at least a portion of the plurality of free blocks that is below a threshold size. Verifying that the capacity of the plurality of free blocks is available to reclaim may include shortening a free block of the plurality of free blocks that is above a threshold size. The composite chunk may include a first portion of the plurality of free blocks from a first chunk of the plurality of used chunks, and a second portion of the plurality of free blocks from a second chunk of the plurality of used chunks. The composite chunk may be created without moving the plurality of free blocks and the at least one non-free block.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. The computer readable program code may be transmitted using any appropriate medium, including but not limited to the internet, wireline, optical fiber cable, RF, etc. A computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGA), micro-controller units (MCUs), or programmable logic arrays (PLA) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. It will be understood that each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Figure 1:
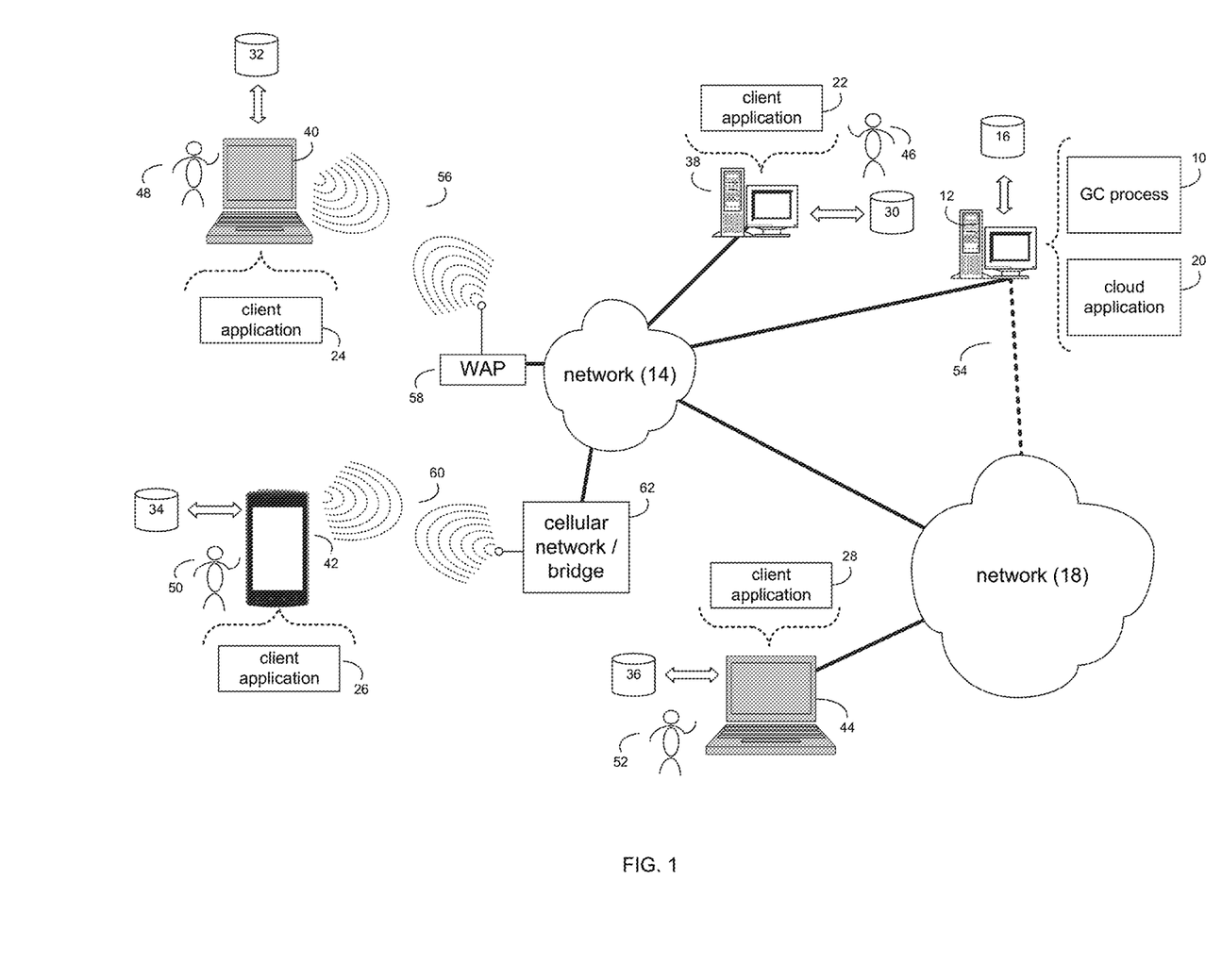
FIG. 1 is an example diagrammatic view of a GC process coupled to a distributed computing network according to one or more example implementations of the disclosure.

Referring now to the example implementation of FIG. 1, there is shown GC process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both). In certain implementations, a computing device may be a physical or virtual device. In many implementations, a computing device may be any device capable of performing operations, such as whether a dedicated processor, a portion of a processor, a virtual processor, a portion of a virtual processor, portion of a virtual device, or a virtual device. In some implementations, a processor may be a virtual processor or a physical processor. In many implementations, logic may be distributed across several processors or virtual processors to execute the logic.

As will be discussed below in greater detail, in certain implementations, garbage collection (GC) process 10 may identify, by a computing device, a plurality of used chunks, wherein the plurality of used chunks may include a plurality of free blocks and at least one non-free block. In some implementations, a capacity of the plurality of free blocks that is available to reclaim may be verified. In many implementations, a capacity of the plurality of free blocks may be reclaimed. In certain implementations, composite chunk from the plurality of free blocks may be created.

In some implementations, the instruction sets and subroutines of GC process 10, which may be stored on storage device 16 coupled to computer 12, may be executed by one or more processors (not shown) and one or more memory architectures (not shown) included within computer 12. In some implementations, storage device 16 may include but is not limited to: a hard disk drive; a flash drive, a tape drive; an optical drive; a RAID array (or other array); a random access memory (RAM); and a read-only memory (ROM).

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. Any data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. The data store may also be a custom database, such as, for example, a flat file database or an XML database. Any other form(s) of a data storage structure and/or organization may also be used. In certain implementations, GC process 10 may be a component of the data store, a standalone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network. An example cloud computing environment that may be used with the disclosure may include but is not limited to, e.g., Elastic Cloud Storage (ECS™) from EMC Corporation of Hopkinton, Mass. In many implementations, other cloud computing environments may be used without departing from the scope of the disclosure.

In some implementations, computer 12 may execute a cloud application (e.g., cloud application 20), examples of which may include, but are not limited to, e.g., a storage system application, a cloud computing application, a data synchronization application, a data migration application, garbage application, or other application that allows for the implementation and/or management of highly available data in a clustered environment (or the like). In certain implementations, GC process 10 and/or cloud application 20 may be accessed via client applications 22, 24, 26, 28. In some implementations, GC process 10 may be a standalone application, or may be an applet/application/script/extension that may interact with and/or be executed within cloud application 20, a component of cloud application 20, and/or one or more of client applications 22, 24, 26, 28. In certain implementations, cloud application 20 may be a standalone application, or may be an applet/application/script/extension that may interact with and/or be executed within GC process 10, a component of GC process 10, and/or one or more of client applications 22, 24, 26, 28. In many implementations, one or more of client applications 22, 24, 26, 28 may be a standalone application, or may be an applet/application/script/extension that may interact with and/or be executed within and/or be a component of GC process 10 and/or cloud application 20. Examples of client applications 22, 24, 26, 28 may include, but are not limited to, e.g., a storage system application, a cloud computing application, a data synchronization application, a data migration application, garbage application, or other application that allows for the implementation and/or management of highly available data in a clustered environment (or the like), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors (not shown) and one or more memory architectures (not shown) incorporated into client electronic devices 38, 40, 42, 44.

In some implementations, storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

In some implementations, one or more of client applications 22, 24, 26, 28 may be configured to effectuate some or all of the functionality of GC process 10 (and vice versa). Accordingly, in certain implementations, GC process 10 may be a purely server-side application, a purely client-side application, or a hybrid server-side/client-side application that is cooperatively executed by one or more of client applications 22, 24, 26, 28 and/or GC process 10.

In some implementations, one or more of client applications 22, 24, 26, 28 may be configured to effectuate some or all of the functionality of cloud application 20 (and vice versa). Accordingly, cloud application 20 may be a purely server-side application, a purely client-side application, or a hybrid server-side/client-side application that is cooperatively executed by one or more of client applications 22, 24, 26, 28 and/or cloud application 20. In some implementations, as one or more of client applications 22, 24, 26, 28, GC process 10, and cloud application 20, taken singly or in any combination, may effectuate some or all of the same functionality, any description of effectuating such functionality via one or more of client applications 22, 24, 26, 28, GC process 10, cloud application 20, or combination thereof, and any described interaction(s) between one or more of client applications 22, 24, 26, 28, GC process 10, cloud application 20, or combination thereof to effectuate such functionality, should be taken as an example only and not to limit the scope of the disclosure.

In some implementations, users 46, 48, 50, 52 may access computer 12 and GC process 10 (e.g., using one or more of client electronic devices 38, 40, 42, 44) directly through network 14 or through secondary network 18. Further, computer 12 may be connected to network 14 through secondary network 18, as illustrated with phantom link line 54. In certain implementations, GC process 10 may include one or more user interfaces, such as browsers and textual or graphical user interfaces, through which users 46, 48, 50, 52 may access GC process 10.

In some implementations, the various client electronic devices may be directly or indirectly coupled to network 14 (or network 18). For example, in some implementations, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi®, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
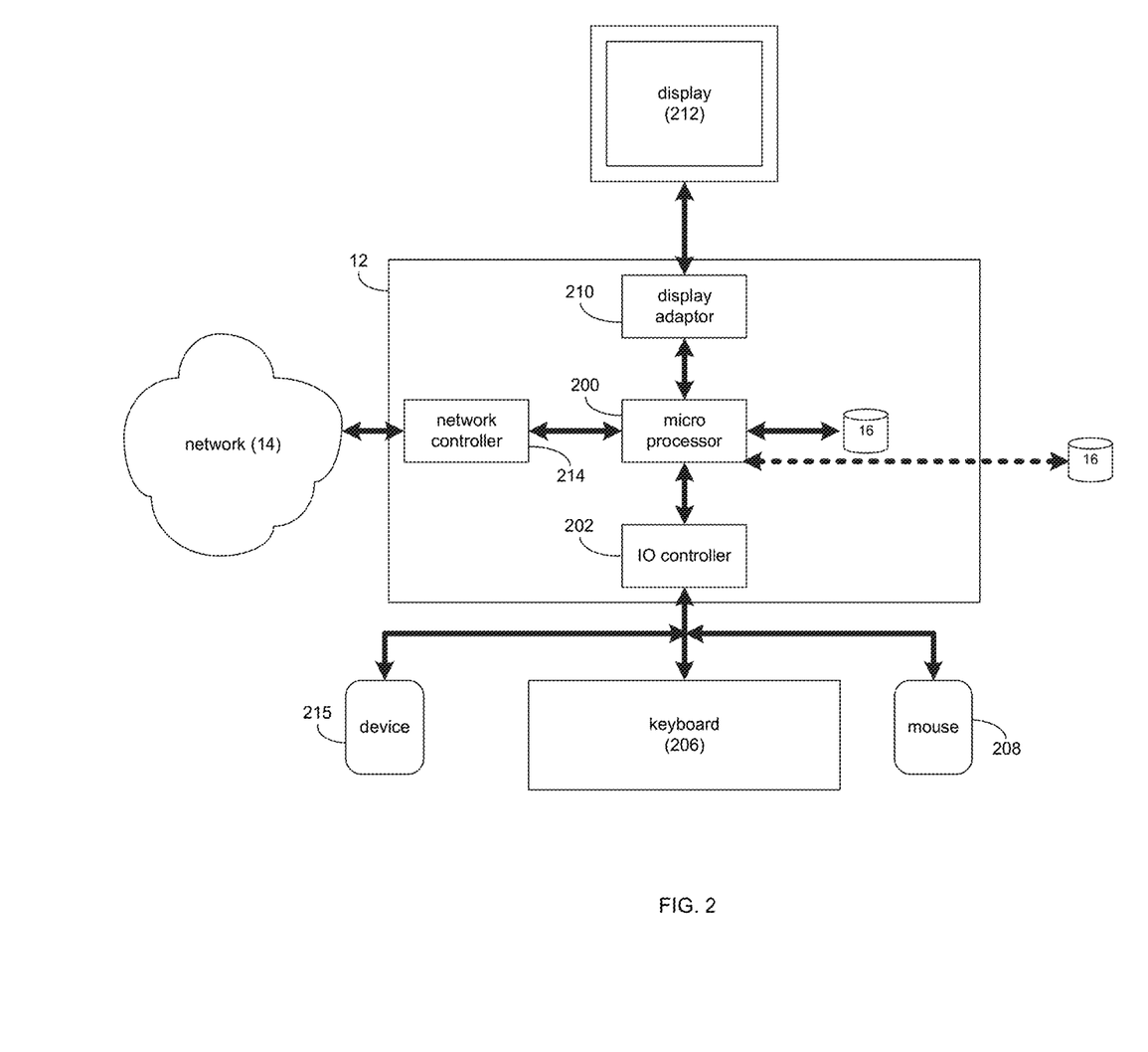
FIG. 2 is an example diagrammatic view of a client electronic device of FIG. 1 according to one or more example implementations of the disclosure.

Referring also to the example implementation of FIG. 2, there is shown a diagrammatic view of computer 12. While computer 12 is shown in this figure, this is for example purposes only and is not intended to be a limitation of this disclosure, as other configurations are possible. Additionally, in many implementations, any computing device capable of executing, in whole or in part, CS process 10 may be substituted for computer 12 (in whole or in part) within FIG. 2, examples of which may include but are not limited to client electronic devices 38, 40, 42, 44.

In some implementations, computer 12 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device(s) (e.g., storage device 16). An I/O controller (e.g., I/O controller 202) may be configured to couple microprocessor 200 with various devices, such as keyboard 206, pointing/selecting device (e.g., touchpad, touchscreen, mouse 208, etc.), custom device (e.g., device 215), USB ports (not shown), and printer ports (not shown). A display adaptor (e.g., display adaptor 210) may be configured to couple display 212 (e.g., touchscreen monitor(s), plasma, CRT, or LCD monitor(s), etc.) with microprocessor 200, while network controller/adaptor 214 (e.g., an Ethernet adaptor) may be configured to couple microprocessor 200 to the above-noted network 14 (e.g., the Internet or a local area network).

Figure 4:
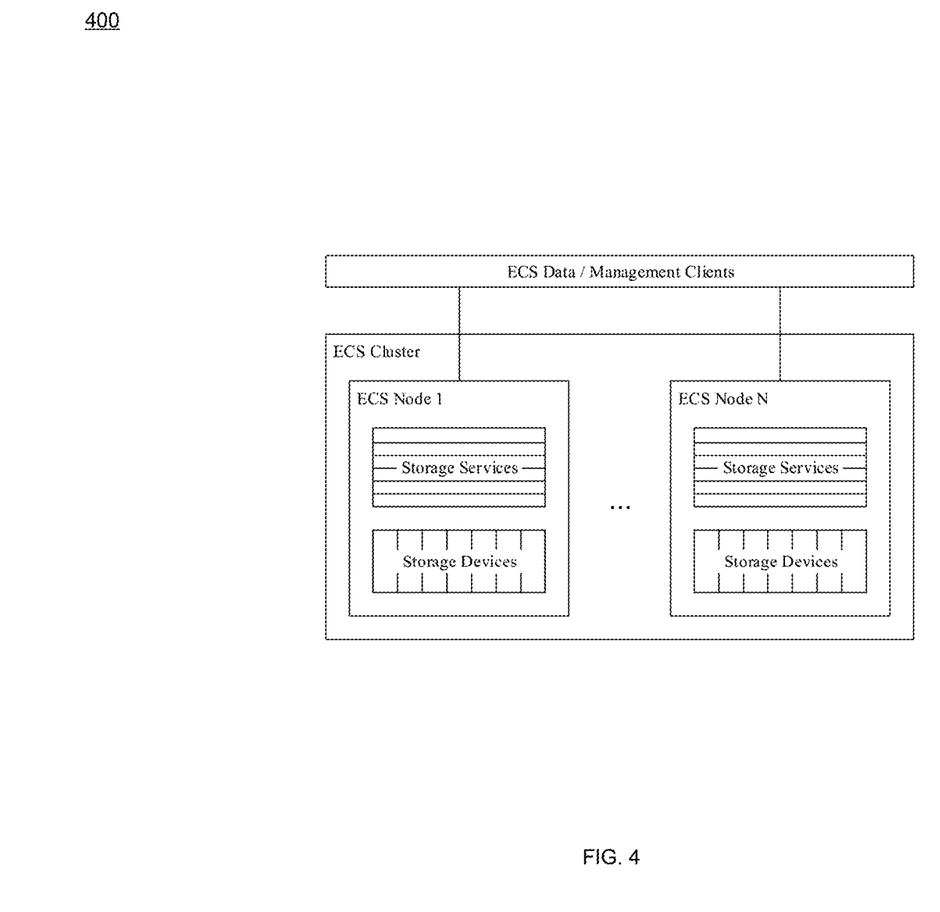
FIG. 4 is an example diagrammatic view of a high level architecture of a cluster that may be used by the GC process of FIG. 1 according to one or more example implementations of the disclosure.

In some implementations, and referring at least to the example implementation of FIG. 4, an example high level architecture of a cluster 400 is shown. In some implementations, cluster 400 may consist of one or more storage nodes (e.g., hardware nodes). In certain implementations, a cluster may be an ECS cluster. In some implementations, each storage node may manage (e.g., via GC process 10 and/or cloud application 20) several storage devices. In some implementations, the storage devices of cluster 400 may include, e.g., hard disk drives, aka HDDs. It will be appreciated that other types of storage devices may be used without departing from the scope of the disclosure. In many implementations, the HDDs may be used to store user data (e.g., comment, description, tag, etc.) and system metadata. For example, user data may be content of a block/file/object received from a client application (e.g., client application 22). In certain implementations, search trees used to keep the metadata may be large. In some implementations, tree updates may be very expensive on resources. Thus, in some implementations, journals (e.g., tree journals) may be used. In some implementations, there may be a journal per search tree. In the example, when a journal contains enough information, a bulk update may be applied to the corresponding tree. In some implementations, journals may contain tree modification requests of the following example types: (1) Create a key, e.g. an object ID, with a value, e.g., the metadata associated with the object; (2) Update value for a key after some event, e.g., the application sent new metadata, or cache process 10 (re)stored object content in some new chunk so object location information has changed; (3) Delete a key.

In many implementations, a single node of ECS that runs on a hardware appliance may manage, e.g., from 15 to 60 storage devices, although more or less storage devices may also be managed. In some implementations, each node may run (e.g., via GC process 10 and/or cloud application 20) a number of services, which may together implement a storage business logic. For instance, in some implementations, a single node may manage around 20 services, although more or less services may also be managed. In many implementations, an ECS cluster may be described, however other example clusters may be used without departing from the scope of the disclosure. As such, the use of ECS should be taken as example only and not to otherwise limit the scope of the disclosure.

As will be appreciated, cluster technology may use innovative methods for HDD (or other storage device) capacity management. In some implementations, cluster 400 (e.g., cloud application 20) may rely on a file system. For example, in some implementations, the storage device space if cluster 400 may be partitioned into a set of blocks of fixed size called "chunks". In many implementations, information, user data and various kinds of metadata may be stored in these chunks.

In some implementations, there may be different types of chunks (e.g., one type per capacity user). For instance, in some implementations, user data may be stored in one or more so-called "repository chunks", or just "repo chunks". As another example, in some implementations, data replicated from a remote location may be stored in one or more so-called "replication chunks." In many implementations, a cluster process for data regeneration may be referred to as "recovery", and may store the associated data in one or more "recovery chunks." In some implementations, cluster 400 (e.g., via cloud application 20) may include a plurality of system processes that may minimize capacity overheads on data protection, e.g.: Erasure Coding (EC) and XOR upon replicated data, which may store associated data in one or more so-called "EC chunks" and "XOR chunks." In some implementations, metadata may be stored in a tree-like structure, where the trees may be stored in one or more so-called "tree chunks." In many implementations, tree journals may be stored in one or more "journal chunks."

Figure 5:
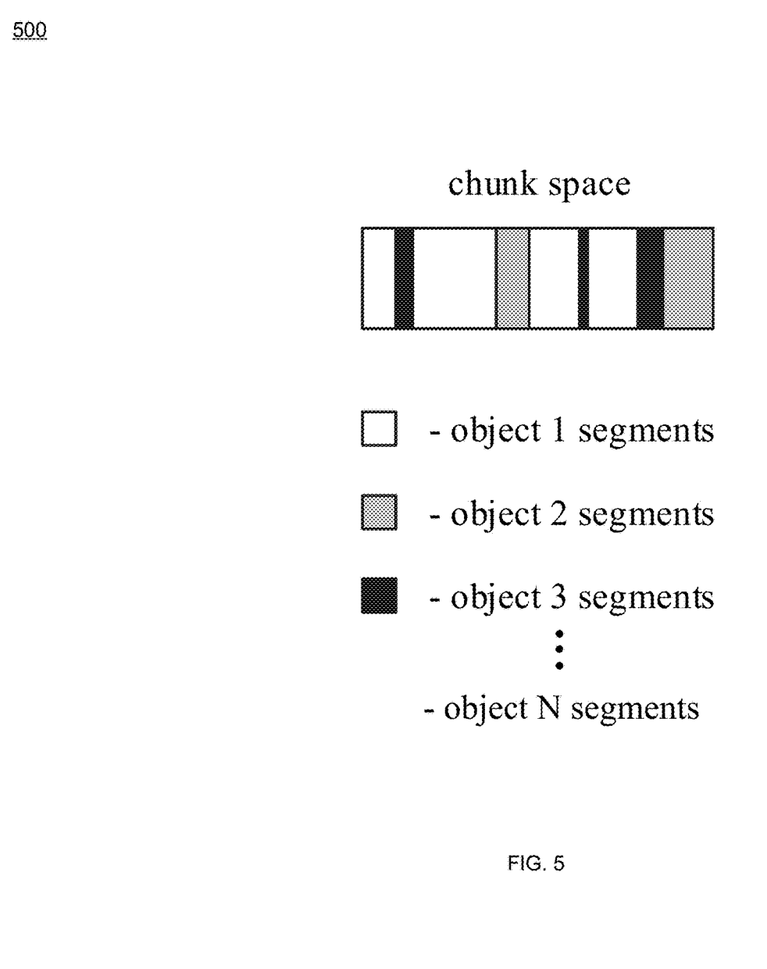
FIG. 5 is an example diagrammatic view of a data chunk that may be used by the GC process of FIG. 1 according to one or more example implementations of the disclosure.

In some implementations, and referring at least to the example implementation of FIG. 5, an example layout of a repo chunk (e.g., repo chunk 500) is shown. In some implementations, chunks of each type may be shared. For instance, in many implementations, one repo chunk may contain fragments of several user objects. For example, as can be seen from the implementation of FIG. 5, a single repo chunk may include mixed segments of one or more user objects (e.g., object 1, object 2, object 3, etc.). In some implementations, there may be a number of storage services that may work with their associated storage devices and chunks. For instance, in certain implementations GC process 10 and/or cloud application 20 may include a storage chunk management service that may facilitate storage chunk allocation/reclamation, protection via EC, Geo replication, etc. In some implementations, GC process 10 and/or cloud application 20 may include a storage (server) management service that may manage available storage devices capacity and track storage device states. In some implementations, GC process 10 and/or cloud application 20 may include a storage (server) service that may interface with the storage devices.

In some implementations, GC process 10 may include a copying garbage collector process that may increase capacity use efficiency for chunks (or other data types) with user data (or other data). In many implementations, a copying garbage collector process approach may help ensure high performance and capacity efficiency when, e.g., storage clients write data only. In certain implementations, when storage clients delete data as well, it may cause internal chunk fragmentation. As a result, in some implementations, capacity efficiency may become an issue. To help with this inefficiency, in some implementations, GC process 10 may implement copying garbage collection for repo chunks. For example, in many implementations, user data from two or more poorly used chunks may be copied to a new chunk. In certain implementations, offloaded chunks may pass a verification process of GC process 10 and their capacity may be reclaimed.

Figure 6:
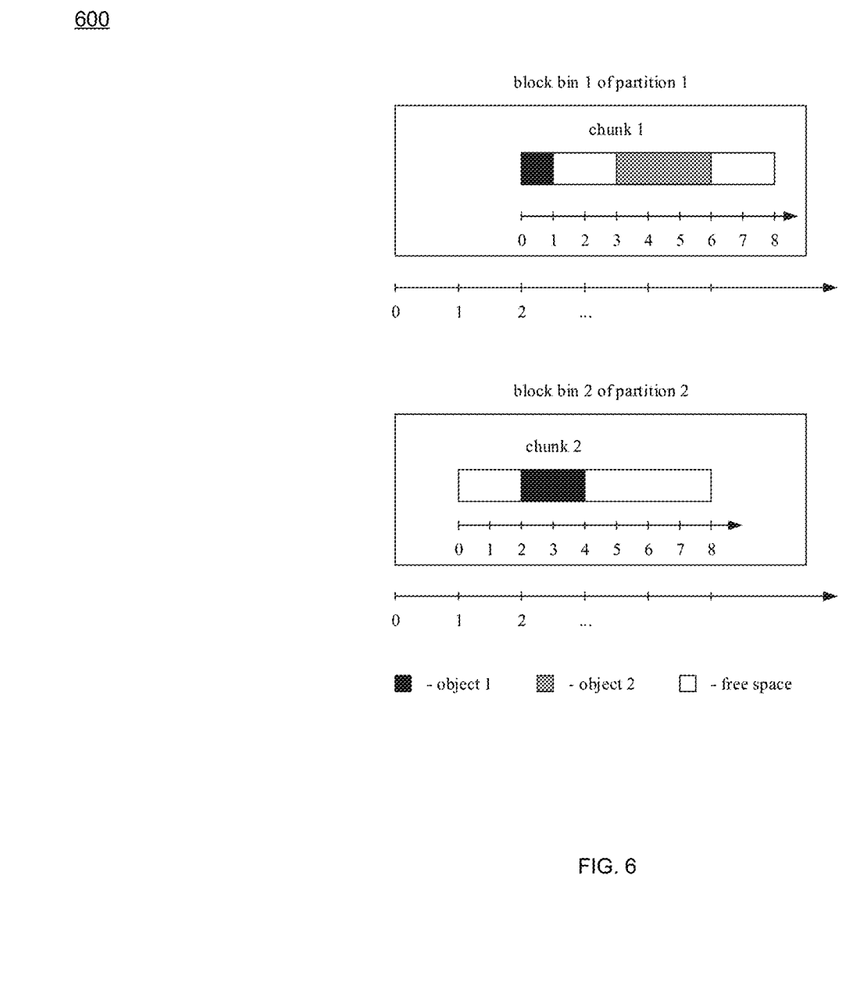
FIG. 6 is an example block bin and chunk layout before garbage collection occurs that may be used by the GC process of FIG. 1 according to one or more example implementations of the disclosure.

In some implementations, and referring at least to the example implementation of FIG. 6, an example block bin and chunk layout 600 before the above-noted garbage collection occurs is shown. In the example implementation of FIG. 6, there are two chunks (e.g., chunk 1 and chunk 2) in storage device 16, that store data segments of two objects (e.g., object 1 and object 2). In the example of FIG. 6, chunk 1 may be a part of block bin 1 of partition 1 and chunk 2 may be a part of block bin 2 of partition 2. Assume for example purposes only that these two chunks have low capacity efficiency use. In some implementations, the goal of garbage collection (GC) process may be to increase capacity use efficiency via, e.g., copying object 1 and object 2 segments to a new chunk, and reclaiming all capacity occupied by chunk 1 and chunk 2. It will be appreciated in certain implementations that more or less chunks may be used without departing from the scope of the disclosure.

As noted above, in certain implementations, a cluster may run a set of storage services, which together may implement, e.g., storage business logic. In some implementations, an example service may include, e.g., a so-called blob service. Generally, a Binary Large OBject (BLOB) may be a collection of binary data stored as, e.g., a single entity in a database management system. In many implementations, blobs may be, for example, images, audio or other multimedia objects, binary executable code, etc. GC process 10 may maintain an object table, such as the object table in Table 1 below. In some implementations, the object table may keep track of objects in the system. In some implementations, before GC process 10 starts, the object table may contain the following example information.

TABLE 1

Object table before GC

| | Object Info | | |
|---|---|---|---|
| Object ID | Chunk ID | Offset | Length |
| 1 | 1 | 0 | 1 |
| | 2 | 2 | 2 |
| 2 | 1 | 3 | 3 |

As seen in the example Table 1, object 1 has, e.g., two segments: one in chunk 1 and one in chunk 2. Further in the example, object 2 consists of one segment in chunk 1. It will be appreciated that various other numbers of chunks per object and partition may be used without departing from the scope of the disclosure.

In some implementations, GC process 10 may include a chunk management (CM) service that may maintain a chunk table, such as the chunk table in Table 2 below. In the example Table 2, before GC process 10 starts, the table may contain the following example information.

TABLE 2

Chunk table before GC

| | | Chunk Info | | |
|---|---|---|---|---|
| Chunk ID | Partition | Block bin | Offset | Length |
| 1 | 1 | 1 | 2 | 8 |
| 2 | 2 | 2 | 1 | 8 |

As seen in the example Table 2, chunk 1 may be a part of block bin 1 of partition 1 and chunk 2 may be a part of block bin 2 of partition 2. In other implementations, various other numbers of chunks per block bin and partition may be used without departing from the scope of the disclosure.

In some implementations, GC process 10 may include a storage service manager (SSM) that may keep track of free and used capacity blocks. In some implementations, before GC process 10 starts, the SSM table may contain the following example information.

TABLE 3

Storage service manager table before GC

| Partition | Block bin | Offset | Length | User |
|---|---|---|---|---|
| | | Busy blocks | | |
| 1 | 1 | 2 | 8 | chunk 1 |
| 2 | 2 | 1 | 8 | chunk 2 |

Figure 7:
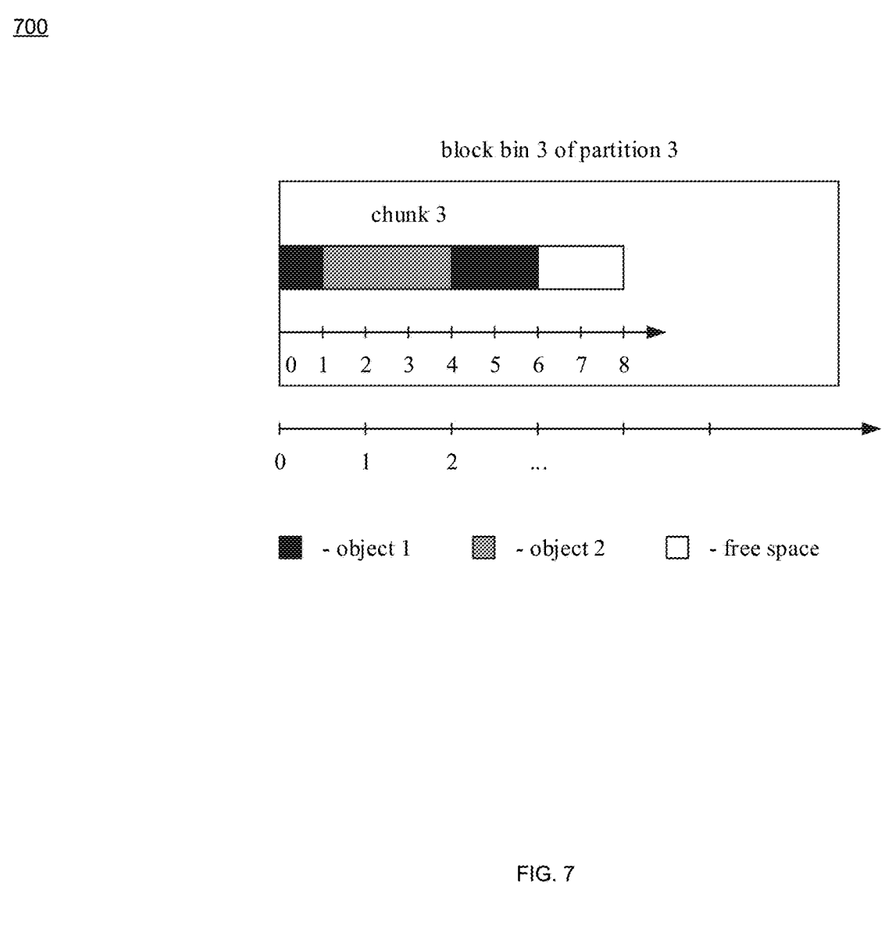
FIG. 7 is an example block bin and chunk layout before garbage collection occurs an example block bin and chunk layout 700 after garbage collection occurs that may be used by the GC process of FIG. 1 according to one or more example implementations of the disclosure.

As seen in the example Table 3, during garbage collection, chunk 3 may be allocated within block bin 3 of partition 3. In some implementations, user data segments from chunk 1 and chunk 2 may be copied by GC process 10 to this new chunk 3. In some implementations, the segments may be copied in the order they are stored in the old chunks, e.g., the two segments of object 1 are not merged. In some implementations, after copying is complete, chunk 1 and chunk 2 may be verified and their capacity may be reclaimed by GC process 10. An example implementation of FIG. 7 shows an example block bin and chunk layout 700 after GC, and the example tables below show the example resulting system state.

TABLE 4

Object table after GC

| | Object Info | | |
|---|---|---|---|
| Object ID | Chunk ID | Offset | Length |
| 1 | 3 | 0 | 1 |
| | 3 | 4 | 2 |
| 2 | 3 | 1 | 3 |

TABLE 5

Chunk table after GC

| | | Chunk Info | | |
|---|---|---|---|---|
| Chunk ID | Partition | Block bin | Offset | Length |
| 3 | 3 | 3 | 3 | 8 |

TABLE 6

Storage service manager table after GC

| Partition | Block bin | Offset | Length | User |
|---|---|---|---|---|
| | | Busy blocks | | |
| 3 | 3 | 0 | 8 | chunk 3 |
| | | Free blocks | | |
| 1 | 1 | 2 | 8 | — |
| 2 | 2 | 1 | 8 | — |

As seen in the example Table 6, capacity of chunks 1 and 2 became free, and the same objects may occupy a single chunk (e.g., chunk 3). Therefore, in the example of FIG. 6, capacity use efficiency for the given two objects increased by, e.g., two times.

In some implementations, however, there may be situations where the throughput of the GC process is not high enough. For instance, in some implementations, the above GC process may not take into account the pattern of storage user behavior. For example, in certain implementations, typically, storage users do not delete their data while there is free capacity available. In many implementations, when free capacity starts to run short, users may cleanup and delete some unnecessary data. For instance, in some implementations, assume for example purposes that 25% of all objects are deleted. In the aforementioned example, after the deletion, users may expect to see a corresponding 25% of total storage capacity become free again. However, in certain implementations, it is possible that the users may see that they did not gain any free capacity, or even see that they have even less free capacity. In some implementations, this may occur in examples where, e.g., after deleting 25% of data, the system may contain the same amount of chunks, but with 75% capacity use efficiency on average. In some implementations, the users may see some or all free capacity available again after GC process 10 copies some or all of the live data. Further in the example, it may be about 75% of total system capacity. Moreover, in some implementations, a single GC operation may require traversal of huge object tables (e.g., implemented as trees) stored on the above-noted storage devices. Thus, in some implementations, the above-noted GC process may take a significant amount of time (e.g., hours, days, weeks, months, etc.). Additionally, in certain implementations, data copying may require allocation of new target chunks, which may be why users may observe further decrease of free capacity available. In some implementations, the situation may be exacerbated when, e.g., there is no capacity to allocate new chunks needed for the GC process. As such, in some implementations, GC process 10 may implement a GC process that may help ensure "fast" capacity reclamation.

As will be discussed in greater detail below, in some implementations, GC process 10 may implement a so-called quasi-compacting garbage collection technique for clusters, such as ECS, which may help ensure fast capacity reclamation for systems, e.g., with critical free capacity deficit (e.g., a deficit of free chunks) and/or with an average chunk capacity use that may be high. As noted above, the present disclosure may be used with any type of cluster or cluster management system without departing from the scope of the disclosure. As such, the description of ECS should be taken as example only and not to otherwise limit the scope of the disclosure.

Figure 3:
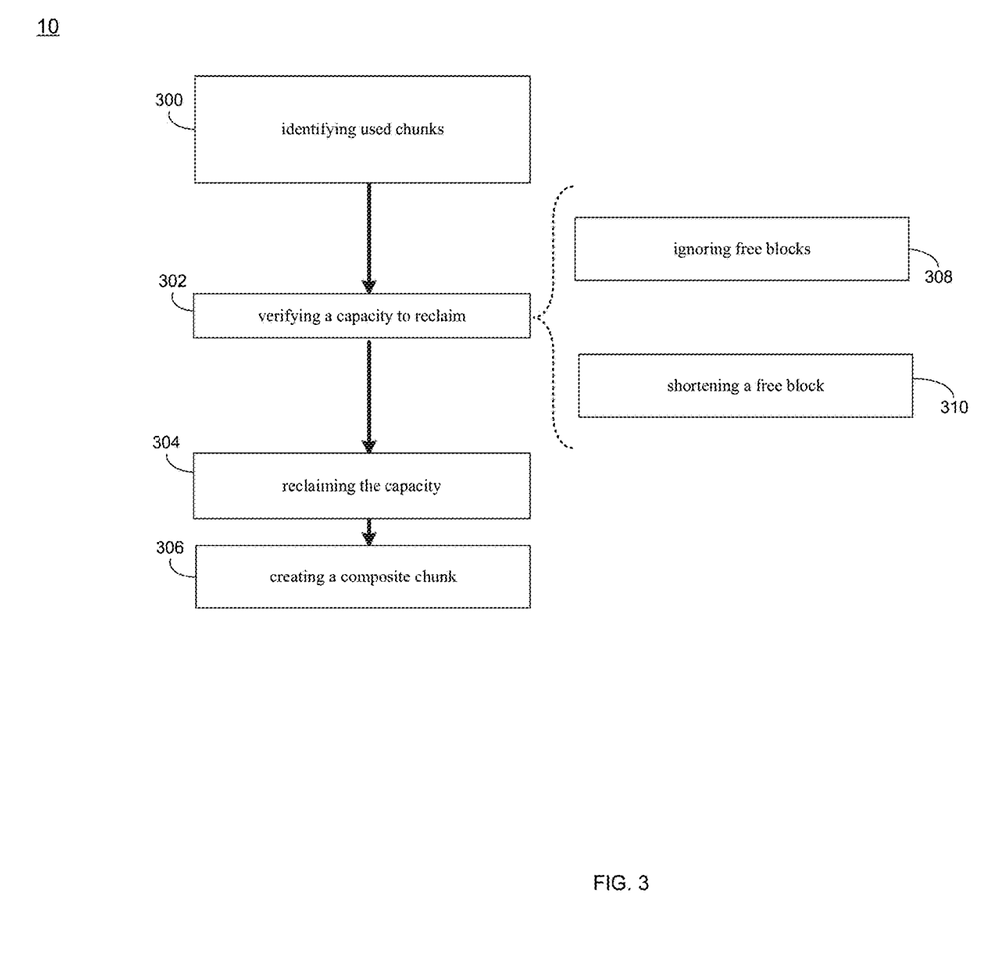
FIG. 3 is an example flowchart of the GC process of FIG. 1 according to one or more example implementations of the disclosure.
Figure 8:
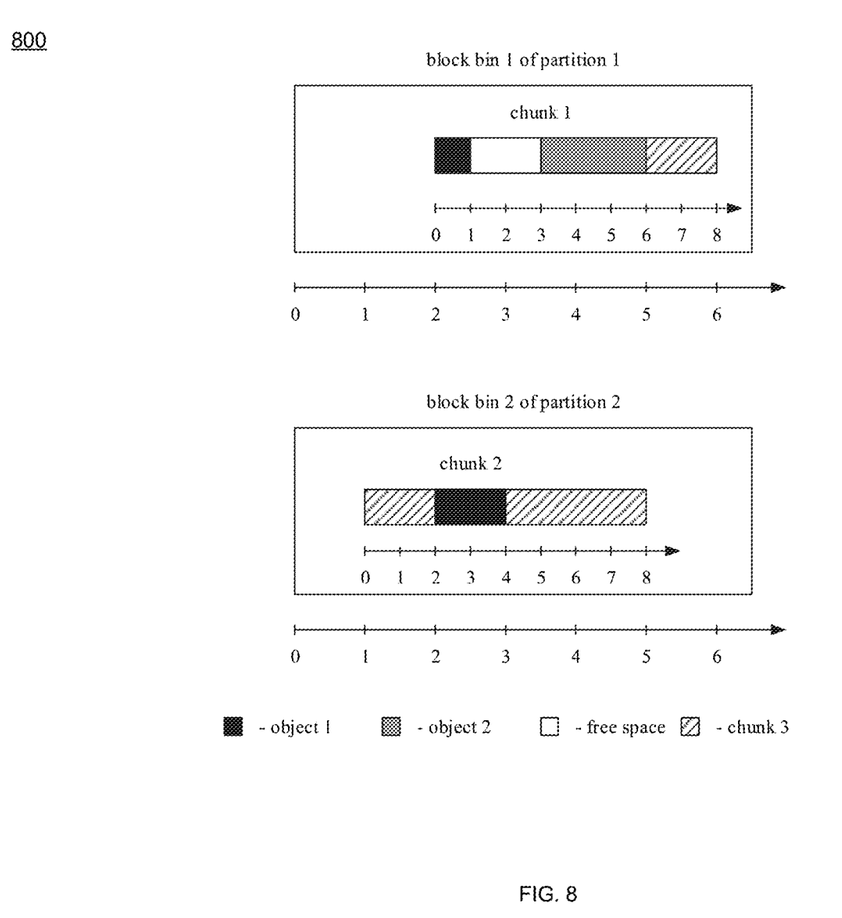
FIG. 8 is an example block bin and chunk layout after quasi-compacting occurs that may be used by the GC process of FIG. 1 according to one or more example implementations of the disclosure.

The Garbage Process:

As discussed above and referring also at least to the example implementations of FIGS. 3 and 8, garbage collection (GC) process 10 may identify 300, by a computing device, a plurality of used chunks, wherein the plurality of used chunks may include a plurality of free blocks and at least one non-free block. GC process 10 may verify 302 that a capacity of the plurality of free blocks is available to reclaim. GC process 10 may reclaim 304 the capacity of the plurality of free blocks. GC process 10 may create 306 a composite chunk from the plurality of free blocks.

In some implementations, GC process 10 may identify 300, by a computing device (e.g., computer 12), a plurality of used chunks, wherein the plurality of used chunks may include a plurality of free blocks and at least one non-free block. For instance, the following example GC process 10 (resulting in example FIG. 8 discussed below) may be compared to the above-noted FIGS. 6-7. In the example, GC process 10 may implement the quasi-compacting garbage collector process. In some implementations, GC process 10 may identify 300 and sort free blocks and non-free blocks within existing chunks. In some implementations, the resulting Table 7 may include the following example information:

TABLE 7

Chunk table after GC

| Free block # | Chunk ID | Object Info Offset | Length |
|---|---|---|---|
| 1 | 2 | 4 | 4 |
| 2 | 2 | 0 | 2 |
| 3 | 1 | 6 | 2 |
| 4 | 1 | 1 | 2 |

In some implementations, free block 3 may go before block 4, e.g., since it may be on the edge of the chunk. In some implementations, as will be discussed in greater detail below, reclamation of its capacity may make the chunk shorter, but may or may not make it a composite.

In some implementations, the plurality of used chunks may include at least one repository chunk, wherein the at least one repository chunk may include user data. For example, user data may be content of a block/file/object received from a client application (e.g., client application 22). In many implementations, search trees used to keep the metadata may be large. In some implementations, tree updates may be very expensive on resources. Thus, in some implementations, journals (e.g., tree journals) may be used. In some implementations, there may be a journal per search tree. In the example, when a journal contains enough information, a bulk update may be applied to the corresponding tree. In certain implementations, journals may contain tree modification requests of the following example types: (1) Create a key, e.g. an object ID, with a value, e.g., the metadata associated with the object; (2) Update value for a key after some event, e.g., the application sent new metadata, or cache process 10 (re)stored object content in some new chunk so object location information has changed; (3) Delete a key.

In some implementations, GC process 10 may verify 302 that a capacity of the plurality of free blocks is available to reclaim. For example, in some implementations, GC process 10 may verify 302 the chunks that have free blocks to make sure it is safe to reclaim their capacity. In some implementations, GC process 10 may verify 302 a portion of the chunk or the entire chunk with free blocks. In some implementations, GC process 10 may verify 302 that, for example, (1) there are no live data objects that reference free blocks; and (2) object bookkeeping for used blocks is accurate.

In some implementations, verifying 302 that the capacity of the plurality of free blocks is available to reclaim may include ignoring 308 at least a portion of the plurality of free blocks that is below a threshold size. For example, in some implementations, for instance, to minimize overhead on fragmentation and amount of metadata to be kept, GC process 10 may ignore "small" free blocks. Thus, in some implementations, only "large" enough blocks may be considered candidates for their capacity reclamation. In some implementations, free blocks identified 300 may be sorted by size, e.g., in descending order. As will be discussed below, in some implementations, "large" free blocks may be considered as the first candidates for capacity reclamation. In some implementations, this may increase the chances to have composite chunks that contain, e.g., 2-3 blocks only, not, e.g., 7-8.

In some implementations, e.g., to simplify new composite chunk creation, GC process 10 may operate with free blocks of predefined sizes. For instance, assume for example purposes only that free blocks may have the following example sizes: ⅛, ¼, and ½ of chunk size. Further assume that the predetermined size is ½ of chunk size. In the example, while verifying 302 that the capacity of the plurality of free blocks is available to reclaim, GC process 10 may identify 300 a free block that is ⅛ of chunk size, but because that is below the predetermined threshold of ½ of chunk size, GC process 10 may ignore 308 it (e.g., not include it as a candidate to verify for reclamation). On the other hand, while verifying 302 that the capacity of the plurality of free blocks is available to reclaim, GC process 10 may identify 300 a free block that is ½ of chunk size, and because that is at the predetermined threshold of ½ of chunk size, GC process 10 may include it as a candidate to verify for reclamation.

In some implementations, GC process 10 may be expected to work in pair with existing copying GC processes. In some implementations, that may contribute to a decision to ignore 308 chunks with low capacity use (for example, ¼ of chunk size and lower), since it may be easier for GC process 10 to offload such chunks via data copying than to manage composite chunks. In some implementations, other examples of the predetermined threshold size may be used without departing from the scope of the disclosure.

In some implementations, verifying 302 that the capacity of the plurality of free blocks is available to reclaim may include shortening 310 a free block of the plurality of free blocks that is above a threshold size. For instance, assume for example purposes only that while verifying 302 that the capacity of the plurality of free blocks is available to reclaim, GC process 10 may identify 300 a free block that is ¾ of chunk size. In the example, because that is above the predetermined threshold size of ½ of chunk size, GC process 10 may shorten 310 the ¾ of chunk to ½ to fit the largest predefined size value, thereby creating ½ of chunk size and ¼ of chunk size. Thus, in the example, GC process 10 may ignore 308 the ¼ of chunk size (e.g., not include it as a candidate to verify for reclamation) and may include the shortened 310 ½ of chunk size as a candidate to verify for reclamation.

In some implementations, this process may be repeated using a smaller predetermined threshold size than previously used. For instance, in some implementations, after using a predefined threshold size of ½ of chunk size, GC process 10 may subsequently perform the same process again using a shorter size (e.g., ¼ of chunk size).

In some implementations, GC process 10 may reclaim 304 the capacity of the plurality of free blocks. For example, for each portion of the chunk(s) that GC process 10 has identified 300 and verified 302 as available to reclaim, GC process 10 may reclaim 304 those portions. In some implementations, reclamation 304 may generally be described as the act of returning busy capacity blocks to the free state. In some implementations, the direct result of reclamation may be the appearance of the free capacity blocks in the SSM table. In some implementations, the side result may be the modification of:
  a. Busy blocks in the SSM table. For example, as discussed below, after reclamation of a single block, the larger busy block to which it belonged may be, e.g., shortened or split into two busy blocks.
  b. Chunks in the Chunk table. Similarly, in some implementations, an example result may be, e.g., one shorter chunk or a composite chunk that may consist of two parts.
  c. Objects in the Object table. In some implementations, if some chunk, which survives reclamation 304 of its block, contains live data stored after that block, then this datas' offset within the chunk may be modified.

In some implementations, once reclaimed 304, those portions may be available to be used with the composite chunk (discussed in greater detail below).

In some implementations, the storage service manager (SSM) portion of GC process 10 may manage free capacity blocks and may use them to create new Repo chunks (as will be discussed below). Thus, in certain implementations, SSM also may support composite chunks, e.g., chunks that consist of more than one block. In some implementations, GC process 10 may use large enough free blocks (for instance, ½ of chunk size) to create new chunks of a smaller size; however, fixed chunk size may be important for incoming traffic handling. As such, in many implementations, while GC process 10 may shorten an old chunk, new chunks may be required to be of known size.

In some implementations, composite chunks may be less desirable than solid ones, as composite chunks may require more sophisticated management, and in some implementations, writing to and reading from a composite chunk may be slower than for a solid chunk. Thus, in some implementations, GC process 10 may be used sparingly (e.g., when it is clear that copying GC cannot keep up the pace and users may get a "no capacity error" shortly). In some implementations, even when a probability of getting a "no capacity error" is high, GC process 10 may still wait to take apart existing chunks and create new composite chunks. For example, GC process 10 may do some preparations only (e.g., GC process 10 may identify 300 the free blocks and verify 302 them). In the example, GC process 10 may wait as long as possible to reclaim 304 capacity of the free blocks and pass information about them to the SSM.

In some implementations, GC process 10 may create 306 a composite chunk from the plurality of free blocks. For instance, and referring at least to the example implementation of FIG. 8, an example block bin and chunk layout 800 after quasi-compacting is shown. In the example of FIG. 8, when it is time to create a new chunk and there is no capacity for it, GC process 10 may reclaim 304 capacity of the first three free blocks to create 306 a new composite chunk.

In some implementations, the composite chunk may include a first portion of the plurality of free blocks from a first chunk of the plurality of used chunks, and a second portion of the plurality of free blocks from a second chunk of the plurality of used chunks. For instance, in some implementations, the composite chunk 3 includes the first portion of the plurality of free blocks from the first chunk (e.g., the blocks from object 1 in the first and second chunks from FIG. 6) and includes the second portion of the plurality of free blocks from a second chunk of the plurality of used chunks (e.g., the blocks from object 2 in the second chunk from FIG. 6).

TABLE 8

Object table after GC

| Object Info | | | |
|---|---|---|---|
| Object ID | Chunk ID | Offset | Length |
| 1 | 1 | 0 | 1 |
|   | 2 | 0 | 2 |
| 2 | 1 | 3 | 3 |

In some implementations, as can be seen in Table 8, the offset of the second piece of object 1 changed. In some implementations, the offset may always change when a chunk loses its heading block.

TABLE 9

Chunk table after GC

| | Chunk Info | | | |
|---|---|---|---|---|
| Chunk ID | Partition | Block bin | Offset | Length |
| 1 | 1 | 1 | 2 | 6 |
| 2 | 2 | 2 | 2 | 2 |
| 3 | 2 | 2 | 3 | 4 |
|   | 2 | 2 | 1 | 2 |
|   | 1 | 1 | 5 | 2 |

In some implementations, as can be seen in Table 9, chunk 1 changed its length only, chunk 2 changed its offset and length, and chunk 3 is the resulting composite created 306. In some implementations, the blocks of chunk 3 may be listed in the order of the free blocks from chunks 1 and 2. For example purposes only, the total size of the new chunk 3 may be standard for this example; 8=(4+2+2).

TABLE 10

Storage service manager table after GC

| Partition | Block bin | Offset | Length | Use |
|---|---|---|---|---|
| Busy blocks | | | | |
| 1 | 1 | 2 | 6 | chunk 1 |
| 2 | 2 | 2 | 2 | chunk 2 |
| 2 | 2 | 3 | 4 | chunk 3 |
| 2 | 2 | 1 | 2 | chunk 3 |
| 1 | 1 | 5 | 2 | chunk 3 |

In some implementations, the capacity of the plurality of free blocks may be reclaimed 304 while at least one of the plurality of used chunks is in use by the at least one non-free block. For example, as can be seen from Table 10, chunk 3 may now occupy three busy (e.g., used) blocks.

In some implementations, the composite chunk may be created 306 without moving the plurality of free blocks and the at least one non-free block. For example, in some implementations, when the capacity of some free block within a used chunk is reclaimed, the logical length of the chunk may decrease, e.g., by the size of the free block. In some implementations, the density of the resulting chunk may increase. Thus, in some implementations, the term quasi-compacting may be used, as the prefix "quasi" may indicate that, as opposed to conventional compacting techniques that may physically move data from one or more chunks to a new chunk (such as shown in FIG. 7), the above described GC process 10 may not imply data movement. That is, in certain implementations, during the quasi-compacting process, the physical location of the data in each chunk remains in their respective current chunks, and only the verified free space within each respective chunk is reclaimed to form a new "logical" chunk (as shown in FIG. 8). In some implementations, after capacity of a free block is reclaimed, the resulting chunk may become split into two or more blocks by GC process 10. Thus, in certain implementations, a chunk manager (CM) portion of GC process 10 may be required to support such chunks.

In some implementations, composite chunks, old ones and new ones, may be candidates for GC process 10, even when their capacity use efficiency is high. In some implementations, the goal may be to reduce fragmentation produced by the GC. As such, in some implementations, GC process 10 may free (e.g., reclaim) relatively small blocks and may join the blocks to get free blocks of a standard size to create the composite chunk. In some implementations, GC process 10 may start handling composite chunks only after the risk of a "no capacity situation" has subsided.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
    identifying a plurality of used chunks, wherein the plurality of used chunks includes a plurality of free blocks and at least one non-free block;
    verifying that a capacity of the plurality of free blocks is available to reclaim;
    reclaiming the capacity of the plurality of free blocks; and
    creating a composite chunk from the plurality of free blocks, wherein the composite chunk is created without moving the plurality of free blocks and the at least one non-free block.

2. The computer-implemented method of claim 1 wherein the plurality of used chunks includes at least one repository chunk, wherein the at least one repository chunk includes user data.

3. The computer-implemented method of claim 1 wherein the capacity of the plurality of free blocks is reclaimed while at least one of the plurality of used chunks is in use by the at least one non-free block.

4. The computer-implemented method of claim 1 wherein verifying that the capacity of the plurality of free blocks is available to reclaim includes ignoring at least a portion of the plurality of free blocks that is below a threshold size.

5. The computer-implemented method of claim 1 wherein verifying that the capacity of the plurality of free blocks is available to reclaim includes shortening a free block of the plurality of free blocks that is above a threshold size.

6. The computer-implemented method of claim 1 wherein the composite chunk includes a first portion of the plurality of free blocks from a first chunk of the plurality of used chunks, and a second portion of the plurality of free blocks from a second chunk of the plurality of used chunks.

7. A computer program product residing on a non-transitory computer readable storage medium having a plurality of instructions stored thereon which, when executed across one or more processors, cause at least a portion of the one or more processor to perform operations comprising:

identifying a plurality of used chunks, wherein the plurality of used chunks includes a plurality of free blocks and at least one non-free block;

verifying that a capacity of the plurality of free blocks is available to reclaim;

reclaiming the capacity of the plurality of free blocks; and creating a composite chunk from the plurality of free blocks, wherein the composite chunk is created without moving the plurality of free blocks and the at least one non-free block.

8. The computer program product of claim 7 wherein the plurality of used chunks includes at least one repository chunk, wherein the at least one repository chunk includes user data.

9. The computer program product of claim 7 wherein the capacity of the plurality of free blocks is reclaimed while at least one of the plurality of used chunks is in use by the at least one non-free block.

10. The computer program product of claim 7 wherein verifying that the capacity of the plurality of free blocks is available to reclaim includes ignoring at least a portion of the plurality of free blocks that is below a threshold size.

11. The computer program product of claim 7 wherein verifying that the capacity of the plurality of free blocks is available to reclaim includes shortening a free block of the plurality of free blocks that is above a threshold size.

12. The computer program product of claim 7 wherein the composite chunk includes a first portion of the plurality of free blocks from a first chunk of the plurality of used chunks, and a second portion of the plurality of free blocks from a second chunk of the plurality of used chunks.

13. A computing system including one or more processors and one or more memories configured to perform operations comprising:

identifying a plurality of used chunks, wherein the plurality of used chunks includes a plurality of free blocks and at least one non-free block;

verifying that a capacity of the plurality of free blocks is available to reclaim;

reclaiming the capacity of the plurality of free blocks; and creating a composite chunk from the plurality of free blocks, wherein the composite chunk is created without moving the plurality of free blocks and the at least one non-free block.

14. The computing system of claim 13 wherein the plurality of used chunks includes at least one repository chunk, wherein the at least one repository chunk includes user data.

15. The computing system of claim 13 wherein the capacity of the plurality of free blocks is reclaimed while at least one of the plurality of used chunks is in use by the at least one non-free block.

16. The computing system of claim 13 wherein verifying that the capacity of the plurality of free blocks is available to reclaim includes ignoring at least a portion of the plurality of free blocks that is below a threshold size.

17. The computing system of claim 13 wherein verifying that the capacity of the plurality of free blocks is available to reclaim includes shortening a free block of the plurality of free blocks that is above a threshold size.

18. The computing system of claim 13 wherein the composite chunk includes a first portion of the plurality of free blocks from a first chunk of the plurality of used chunks, and a second portion of the plurality of free blocks from a second chunk of the plurality of used chunks.

* * * * *